[11] 3,574,441

| | | | |
|---|---|---|---|
| [72] | Inventors | Thomas J. Harris<br>Chestnut Hill, Mass.;<br>Erhard Max, Sindelfingen, Germany | |
| [21] | Appl. No. | 778,186 | |
| [22] | Filed | Nov. 22, 1968 | |
| [45] | Patented | Apr. 13, 1971 | |
| [73] | Assignee | International Business Machines<br>Corporation<br>Armonk, N.Y. | |

[54] ACHROMATIC POLARIZATION ROTATOR
6 Claims, 7 Drawing Figs.

[52] U.S. Cl............................................................ 350/150,
350/149, 350/157
[51] Int. Cl............................................................ G02f 1/40
[50] Field of Search........................................... 350/147,
149, 150, 157, 158, 175 (DR)

[56] References Cited
UNITED STATES PATENTS
3,439,974   4/1969   Henry et al. ................   350/149
OTHER REFERENCES
Koester, " Achromatic Combinations of Half-Wave Plates"
J.O.S.A. Vol. 49, No. 4 (Apr. 1959) pp. 405— 409

*Primary Examiner*—David Schonberg
*Assistant Examiner*—Paul R. Miller
*Attorneys* — Hanifin and Jancin and John F. Osterndorf ABSTRACT: Apparatus is provided for effecting controlled alterations in the polarization of a multiwavelength beam of radiation. Plural stress responsive elements are arranged in cascade to receive the radiation from a source; the elements being arranged in differing predetermined directions with respect to the polarization of the radiation. Dependent on the stress applied to the elements, the apparatus is tunable for bandwidth response. When stress is applied, the apparatus operates to provide a second state of operation.

INVENTORS
THOMAS J. HARRIS
ERHARD MAX

BY John F. Osterndorf
ATTORNEY

3,574,441

ACHROMATIC POLARIZATION ROTATOR

BACKGROUND OF THE INVENTION

1. Field of the Invention

This invention relates to radiation control apparatus, and more particularly, to stress responsive apparatus operating achromatically to effect controlled alterations in the polarization of a plurality of wavelengths of radiation.

2. Description of the Prior Art

Numerous technical applications require that a light beam or light spot be produced in raster or random form on a target. To accomplish this objective, light beam deflection systems have been proposed. Among these systems are: Light Beam Deflection System, Ser. No. 285,832, filed Jun. 5, 1963; Light Deflector Apparatus, Ser. No. 757,302, filed Sept. 4, 1968; and U.S. Pat. No. 3,353,894, Electro-Optic Light Deflector Utilizing Total Internal Reflection.

Each of these systems includes plural stages with each stage comprising a dynamic polarization rotator to effect a rotation of the polarization into one of two mutually orthogonal directions and a deflecting element responsive to the particular polarization direction to deflect the beam along one of two different paths.

As described in these references, each of the deflection systems is capable of acting on only one wavelength of light at a time. The particular wavelength is related to the material employed as the polarization rotator and to the amount of stress applied to it. Consequently, these deflection systems are not capable of deflecting more than one wavelength of light at a particular time.

Passive achromatic polarization rotators have been suggested. These rotators employ identical passive half-wave plates of birefringent material having the same retardation and dispersion of birefringence. When the rotator is positioned in the path of a plural wavelength beam, rotation through a fixed angle is accomplished on the beam. Such devices always perform a polarization rotation. As a result they can not be utilized in applications which require two states of operations, i.e., no rotation and rotation by the fixed amount. Moreover, passive achromatic rotators of this type are capable of responding only to a fixed band of wavelengths. They are not adjustable or tunable through a range of such bands.

SUMMARY OF THE INVENTION

As contrasted with the passive polarization rotation apparatus of the prior art, the invention of this application is directed to controllable apparatus which operates achromatically on a plurality of wavelengths of radiation. It is capable of providing two states of operation. The apparatus is also tunable or adjustable for response to different bands of wavelengths. A plurality of stress responsive elements, such as electro-optic crystals, are arranged in cascade to receive linearly polarized light from a source of plural wavelength light. The number of wavelengths to be acted on is equivalent to the number of electro-optic devices. The devices are positioned such that the refractive indices providing a greater speed of propagation are at predetermined differing angles with respect to the linear polarization axis of the original incident light. For a rotation of 90° the retardation of the devices should be such that the sum of the individual retardations of the plates should be an odd multiple of 180°.

The devices are connected in common to a source of potential through switching means. Dependent on the condition of the switching means, the devices remain in the deactivated state and the polarization of the incident light is unaffected providing one state of operation or the devices are activated by placing a difference of potential across them providing the other state of operation. When the devices are activated, each of the wavelengths of the incident light to be acted on is rotated by a predetermined fixed amount in polarization direction. The value of potential applied across the devices is approximately the half-wavelength voltage for the material of the devices for a wavelength between the highest and lowest wavelengths to be switched. By selecting another half-wavelength voltage for application to the devices, another band of wavelengths may be acted on.

DESCRIPTION OF THE PREFERRED EMBODIMENT

Figure 1:
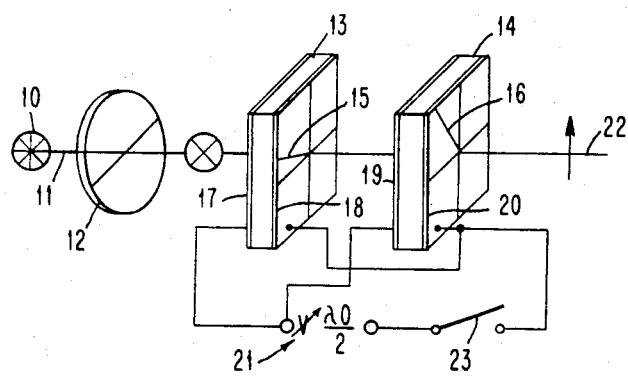
FIG. 1 is a perspective schematic view of apparatus for acting on two wavelengths of light according to the invention.

Referring now to FIG. 1, apparatus is depicted for acting on two wavelengths of light to rotate the polarization of the light by a fixed amount. Source of radiation 10 provides two wavelengths of radiation in beam 11. Source 10 may take the form of a laser device which provides discrete wavelengths of light $\lambda 1$ and $\lambda 2$, or other sources which provide a continuous band of wavelengths. Beam 11 is directed at polarizer 12 which acts to linearly polarize the beam. Polarizer 12 is arranged to horizontally polarize beam 11 as shown at ⊗.

The polarized beam is directed at wave plates 13, 14 arranged in cascade to receive beam 11. Each of the plates may be electro-optic devices formed of potassium dihydrogen phosphate crystals (KDP) having pairs of transparent electrodes 17, 18 and 19, 20 formed in a manner well known in the art on the electro-optic crystal. The electrodes are connected in parallel through an ON/OFF switch 23 to a variable source of potential 21. To operate achromatically, the electro-optic elements should have substantially identical retardation and dispersion of birefringence.

Wave plates 13 and 14 act as retarders in converting the polarization form of beam 11. The conversion is substantially 100 percent efficient. There is no decrease in intensity and no increase in entropy flux. Wave plates 13 and 14 in retarding the polarization of beam 11 resolve the beam into two components, retard the phase of one relative to the other and reunite the two components. They conserve the polarization form of incident beam 11 containing the wavelengths to be acted on but alter the polarization forms of other wavelengths.

Each wave plate 13, 14 is positioned such that the eigenvector associated with the smaller refractive index of the device, i.e., the vector providing the greater speed of propagation for beam 11, is positioned at a predetermined angle with respect to the axis of the incident light beam 11. These vectors are indicated at 15, 16 on wave plates 13, 14, respectively.

When incident beam 11 has a horizontal polarization, as indicated by the ⊗ symbol, beam 22 emitted by second wave plate 14 has the same polarization form if switch 23 is open. Thus, the beam of light is not affected in polarization by the apparatus. When switch 23 is closed, wave plates 13 and 14 are activated by a fixed value of voltage. Wavelengths $\lambda 1$ and $\lambda 2$ forming beam 11 are retarded in such a manner that the polarization state of the light 22 emitted by wave plate 14 has a vertical polarization form, as indicated by the arrow ↑.

Figure 7:
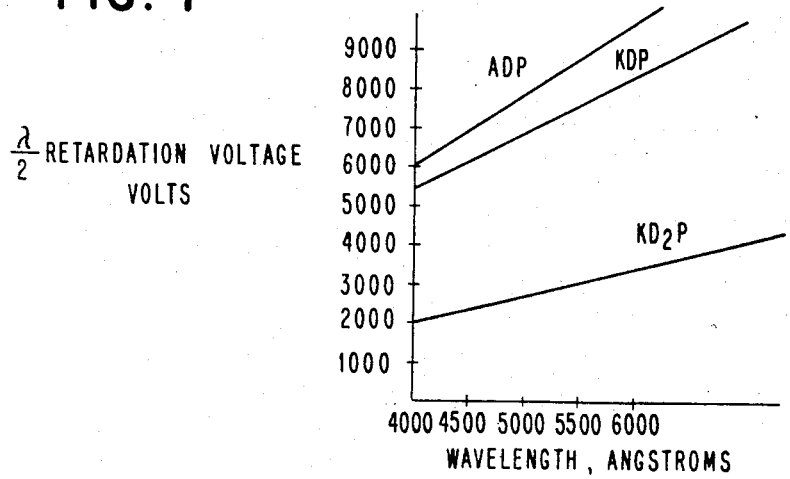
FIG. 7 is a graph illustrating the relationship between half-wavelength voltage and wavelength for particular electro-optic materials.

The value of voltage applied through switch 23 from source 21 is fixed for a particular operation. It is related to a wavelength of light $\lambda 0$ which is substantially midway between wavelengths $\lambda 1$ and $\lambda 2$. As is well known in the art, this value also depends on the particular material employed in the electro-optic device. As shown in FIG. 7 the half-wavelength voltages for particular wavelengths vary considerably for different electro-optic materials.

Wave plates 13, 14 in acting as retarders divide incident beam 11 into orthogonal components retarding one component relative to the other and then recombining the two components to form a single emerging beam. The extent to which one component is retarded relative to the other is called the retardance. This quantity is a measure of the relative change in phase and not in the absolute change. The absolute change in phase caused by interposing the plate in the path of the beam may be hundreds of times greater than the relative change in retardance. The retardance is the magnitude of the relative change and is always positive. It is a constant determined by the position of the device and is independent of the polarization form of the incident beam, assuming that the beam is a linearly incident light of a particular wavelength.

In positioning a wave plate to act as a linear retarder, the retardance and the location of the eigenvector providing the smaller refractive index in the material, i.e., the greater speed of propagation for the light beam through the device, must be known. The angle between the axis providing this greater speed of light propagation and the axis of the incident beam on the wave plate is the azimuth angle. This angle is measured counterclockwise from the axis of the incident beam on the wave plate. In this case, this axis is the horizontal axis.

Figure 2:
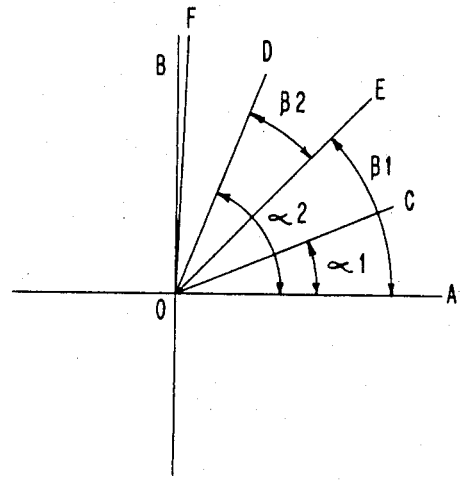
FIG. 2 is a diagram illustrating the operation of the apparatus of FIG. 1.

The positions of the wave plates and their respective axes providing the greater speed of propagation to light beam 11 is indicated in FIG. 2. Axis OA is the axis followed by incident polarized beam 11. Axis OB is the axis desired for exiting beam 22 when switch 23 is closed and wave plates 13 and 14 are activated. The azimuth angle between axis OA and axis OC which corresponds to the eigenvector of wave plate 13 providing the greater speed of propagation to the incident beam is indicated as $\alpha1$. Similarly, OD defines the eigenvector of wave plate 14 providing the greater speed of propagation to the incident beam. It defines the angle $\alpha2$ with respect to axis OA.

Wave plates 13 and 14 act as half-wave plates to retard independently the light beam incident on each. Each plate rotates the polarization of the beam by twice the angle between the axis of the light incident on it and this particular eigenvector of the device. The retardance for two wavelengths of light as accomplished by apparatus employing two activated electro-optic elements should be substantially equal to a positive or negative odd multiple of 180°.

Figure 6:
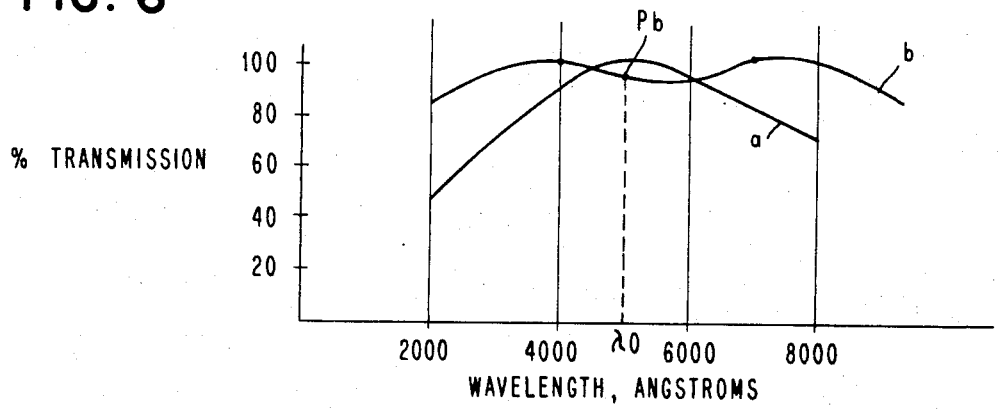
FIG. 6 is a graph illustrating the relationship between wavelength and percentage transmission of light for the apparatus of FIG. 1.

Thus, to accomplish the polarization rotation, plates 13, 14 are activated. Beam 11 is incident on axis OA and the desired axis of the output beam 22 is OB. If $\alpha1$ is 22.5° and $\alpha2$ is 67.5°, the polarization axis of the wavelength $\lambda0$, which is substantially midway between $\lambda1$ and $\lambda2$, is rotated 45° by the first plate and another 45° by the second plate. This arrangement is not achromatic and wavelengths $\lambda1$ and $\lambda2$ are not linearly polarized in the direction OB. This aspect of operation is indicated by the curve $a$ in the graph of FIG. 6. By adding and subtracting, respectively, a known incremental factor, $\Delta$ to the angles $\alpha1$ and $\alpha2$, the wavelengths $\lambda1$ and $\lambda2$ are rotated by 90°. The magnitude of the $\Delta$ angle affects the bandwidth of the combination of half-wave plates and approximates 0.5° to 1° as is known in the art.

Considering the operation of the apparatus of FIG. 1 with respect to the diagram of FIG. 2, it is noted that light of wavelength $\lambda0$ linearly polarized along axis OA encountering wave plate 13 with an azimuth angle of $\alpha1$ equaling 22.5°+$\Delta$ the beam exits from wave plate 13 along axis OE which is displaced from OA by angle $\beta1=2(22.5+\Delta)=45+2\Delta$. The beam exiting from wave plate 13 enters wave plate 14 at an angle $\beta2=67.5-\Delta-(45+2\Delta)=22.5-3\Delta$. Wave plate 14 rotates the incident beam on it by twice the angle $\beta2$ or $45°-6\Delta$. The total rotation for $\lambda0$ is therefore $45°+2\Delta+45°-6\Delta=90°-4\Delta$. Beam 22 exits from wave plate 14 along axis OF with a linear polarization. If beam 22 subsequently passes through an analyzer oriented parallel to OB, the light will be reduced in intensity by an amount proportional to $4\Delta$. The total transmission is represented by the point Pb on curve $b$ in FIG. 6.

A beam 11 with wavelength $\lambda1$ ($\lambda1$ greater than $\lambda0$) linearly polarized along axis OA encountering wave plate 13 with an azimuth angle of $\alpha1$ equaling 22.5°+$\Delta$ exits from wave plate 13 elliptically polarized (left handed) with the major axis of the ellipse oriented at 45° relative to axis OA. This beam enters wave plate 14 and the elliptically polarized light is converted to plane polarized light parallel to axis OB in FIG. 2.

A beam 11 with wavelength $\lambda2$ ($\lambda2$ less than $\lambda0$) linearly polarized along axis OA incident on wave plate 13 exits from plate 13 elliptically polarized (right handed) with the major axis of the ellipse oriented at 45° relative to the axis OA. This beam enters wave plate 14 and the right handed elliptically polarized light is converted to linearly polarized light parallel to the OB axis in FIG. 2.

The voltage $V\lambda0/2$ applied across wave plates 13 and 14 is selected for the particular material forming the plates and for wavelength of light $\lambda0$ that is substantially midway between a band of wavelengths defined by $\lambda1$ and $\lambda2$ that are to be rotated in polarization. Thus, if $\lambda0$ is 5,460 A., $\lambda1$ and $\lambda2$ approximate 6,190 A. and 4,890 A., respectively, when the incremental angle $\Delta$ equals 0.5°. By altering this angle the wavelengths $\lambda1$ and $\lambda2$ can similarly be changed.

Figure 5:
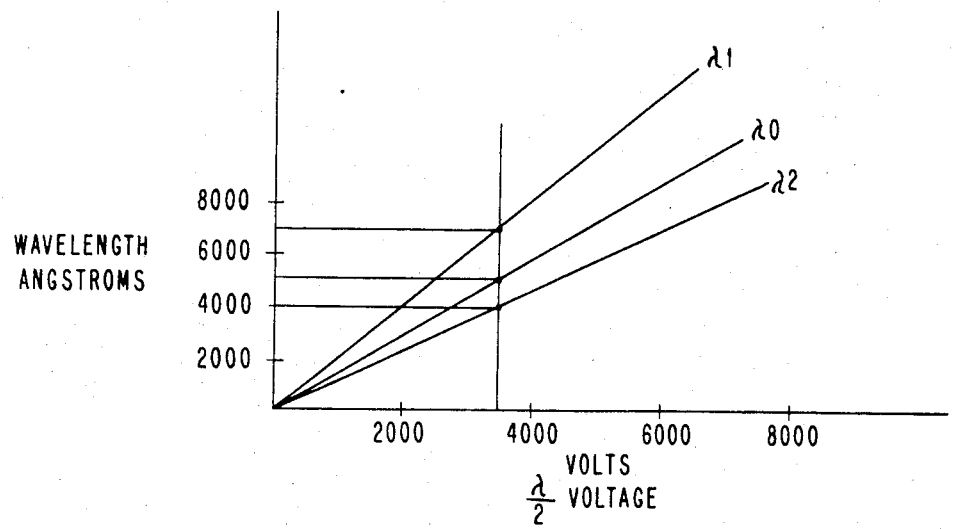
FIG. 5 is a graph illustrating the relationship of wavelength and voltage for the particular material $KD_2P$.

In this connection reference is made to FIG. 5. Thus, for a half-wavelength voltage of 3,600 volts corresponding to the half-wavelength voltage at a wavelength of 5,000 A. and a $\Delta$ angle of 2.5° the apparatus of FIG. 1 acts to rotate the polarization direction of the wavelengths 4,000 A. and 6,800 A. through the fixed angle 90°. This aspect of operation is shown in curve $b$ of the graph of FIG. 6 which shows full transmission for these wavelengths (assuming the beam 22 subsequently passes through an analyzer oriented parallel to axis OB). It is also apparent from FIG. 5 that by altering the value of voltage applied to plates 13, 14 the band of wavelengths responding to the apparatus of FIG. 1 is also altered.

The curve of FIG. 5 is the curve of wavelength vs voltage for potassium dideuterium phosphate ($KD_2P$). When a different material is used the slope of the lines change by having similar appearance. FIG. 7 indicates the comparative curves of half-wavelength voltage and wavelength for KDP crystals along with ammonium dihydrogen phosphate (ADP) and potassium dideuterium phosphate ($KD_2P$) crystals.

Figure 3:
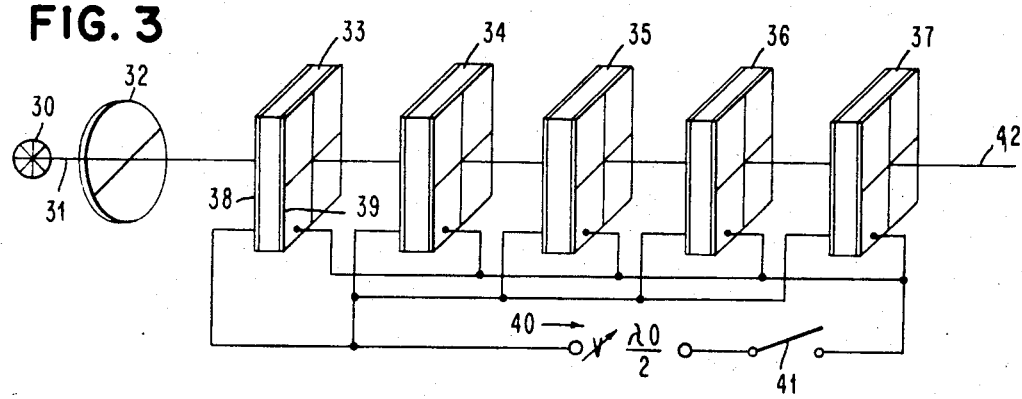
FIG. 3 is a perspective schematic view of apparatus for acting on five wavelengths of light according to the invention.

Referring now to FIG. 3, apparatus is depicted for acting on five wavelengths of light to alter the polarization of all five wavelengths. Light source 30 produces a beam 31 formed of five wavelengths in a band. Beam 31 is horizontally polarized at 32 and directed at electro-optic elements 33—37. Each of the electro-optic elements is provided with transparent electrodes 38, 39 for making suitable electrical connections to them. The devices are electrically joined in parallel to a variable source of voltage 40 and a switch 41. The voltage $V\lambda_0/2$ is the half-wavelength voltage for a wavelength of light substantially midway within the band of the five wavelengths provided by source 30. By varying source 40, the value of voltage used to activate the electro-optic devices is changed and thus the band of wavelengths is also varied. This voltage is also dependent on the particular material used in the device.

Although plates 33—37 have been shown as being connected in parallel to switch 41 and source 40, it is understood that any circuit arrangement which concurrently activates the devices at the proper value of voltage may be utilized.

Figure 4:
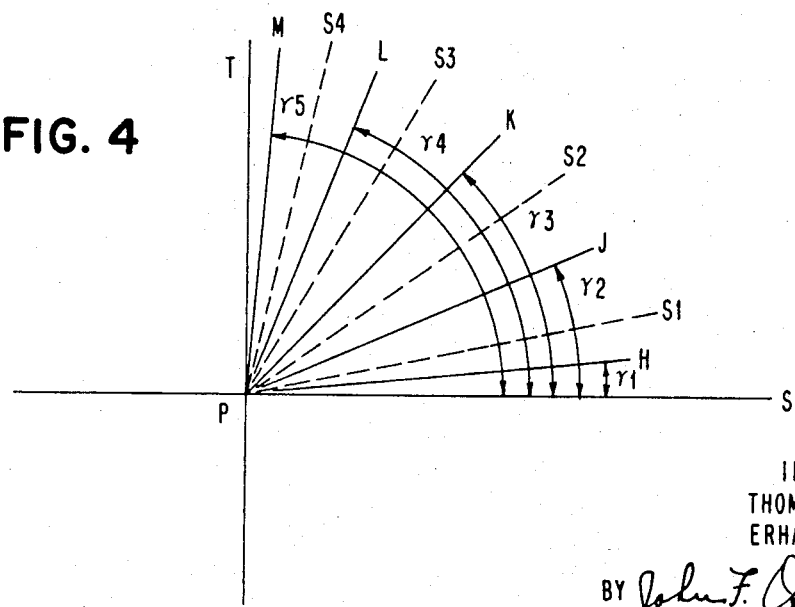
FIG. 4 is a diagram illustrating the operation of the apparatus of FIG. 3.

As shown in FIG. 4 each of the devices 33—37 is positioned with respect to the original incident beam 31 so as to define an angle with the eigenvector of the device which provides the greater speed of propagation of the light through the device. These angles are $\gamma1-\gamma5$. The angles $\gamma1-\gamma5$ are determined by the respective positions of the axes of greater speed of propagation of plates 33—37 to the axis PS of the original incident light beam. These angles are 5.625°, 22.5°, 45°, 67.5° and 84.375°, respectively. In addition, as is the case in all such systems acting on more than two wavelengths of light, the first and last waveplates are altered by an incremental factor to accomplish the polarization rotation operation of the device. Thus the angle formed by the axes of plate 33 is increased by $\Delta$ and the angle of the wave plate 37 is decreased by $\Delta$.

In operation, wave plate 33 rotates beam 31 with wavelength γ0 (for example) by an angle of 11.25° to orientation PS1 providing an angle between PS1 and PJ equaling 11.25°. Device 34 rotates the beam incident on it an additional 22.5° to orientation PS2 providing an angle between PS2 and PK equaling 11.25°. Device 35 rotates the beam incident on it an additional 22.5° to orientation PS3 providing an angle between PS3 and PL equaling 11.25°. Device 36 rotates the light incident on it by an angle of 22.5° to orientation PS4 providing an angle between PS4 and PM of 5.625°. Device 37 rotates the beam an additional 11.25° to orientation PT. This completes the rotation of the beam which includes the five wavelengths. Thus, original beam 31 has been rotated by a total of 90°.

It is readily apparent therefore that the alteration of the polarization direction of a plurality of wavelengths of light can be accomplished concurrently through a fixed angle. It is accomplished by successively retarding the beam of light from the direction of incidence of the original linearly polarized beam. To accomplish a rotation through an angle of 90° the sum of the successive retardations must equal a positive or negative odd multiple of 180°. The total retardation is equivalent to the sum of the individual retardations effected by the individual retarders or wave plates. The rotation effected by each wave plate in the case of half-wave plates is twice the angle between the direction of incidence of the beam incident on the wave plate and the axis of the greatest speed of propagation through the wave plate.

Apparatus for accomplishing this change of polarization direction through a fixed angle of 90° has been described for two and five wavelengths respectively. Table I indicates the angles of the optic axes that provide the greater speed of propagation through the wave plates with respect to the initial direction of polarization in order to accomplish the rotation of 90° for one to five wavelengths. To accomplish this rotation in the instances where a plurality of wavelengths are involved, the first and last wave plates must be offset in a positive and negative manner respectively by an incremental amount indicated as Δ. This amount usually approximates ½° to 1° but it can be several degrees.

TABLE I

| | No. of wavelengths at which rotation is 90° | | | | |
|---|---|---|---|---|---|
| | 1 | 2 | 3 | 4 | 5 |
| Angles of optic axes of wave plate relative to initial beam direction of polarization | | | | | 5.625°+Δ |
| | | | | 7.5°+Δ | |
| | | | 11.25°+Δ | | 22.5° |
| | | 22.5°+Δ | | 30° | |
| | 45° | | 45° | | 45° |
| | 67.5°−Δ | | | 60° | |
| | | 78.75°−Δ | | | 67.5° |
| | | | | 82.5°−Δ | |
| | | | | | 84.375°−Δ |

To obtain a fixed polarization rotation through an angle of 90°, it is noted that with an odd number of wave plates acting on a beam of light having an odd number of wavelengths in a band, a wave plate is always positioned at an angle such that its optic axis providing the greater speed of propagation is displaced 45° from the axis of incidence of the original beam of light. The first one-half of the other plates in such an odd numbered arrangement are positioned according to the following progression until an angle of 45° is achieved:

$$2\,(\exp.)\,\frac{45°}{\frac{n+1}{2}}+\Delta; \quad 4\left[2\,(\exp.)\,\frac{45°}{\frac{n+1}{2}}\right]; \quad 8\left[2\,(\exp.)\,\frac{45°}{\frac{n+1}{2}}\right]\ldots$$

where $n$ is equal to the number of plates. The remaining one-half of the plates are positioned at angles determined by subtracting the angles of the first, second, third... plates, respectively, from 90°. The angle of the last plate is further decreased by Δ.

In the situation where an even number of wave plates are acting on an even number of wavelengths in a band, the first one-half of the plates (up to 45°) follow the following progression:

$$\frac{22.5°}{n-1}+\Delta; \quad 4\left[\frac{22.5°}{n-1}\right]; \quad 8\left[\frac{22.5°}{n-1}\right]\ldots$$

where $n$ is the number of plates. The angles of the second one-half of the plates are determined by subtracting these values from 90°.

With all such systems it is noted that the smaller the value of offset, Δ, for the first and last wave plates, the narrower the range of achromatization but the greater the degree of achromatization within that range. In practice this value of Δ is selected by turning the first and last half-wave plates relative to each other until the best achromatization is obtained. Combinations of any number of electro-optic crystals may be arranged to act as a single electro-optic rotator which is achromatic at an equivalent number of wavelengths. The wavelengths at which the devices are operative can be changed dynamically by changing or tuning the voltage applied to the devices.

While the invention has been particularly shown and described with reference to the preferred embodiments thereof, it will be understood by those skilled in the art that the foregoing and other changes in form and details may be made therein without departing from the spirit and scope of the invention.

We claim:

1. Apparatus for effecting the selective polarization rotation of a plurality of linearly polarized wavelengths of radiation provided by a source through the same fixed angle, comprising:

a plurality of stress responsive devices having substantially identical retardation and dispersion of birefringence and equivalent in number to the number of wavelengths of radiation arranged in cascade to receive the radiation and normally operative to pass said radiation without effect on the polarization of said radiation and operative when stressed to rotate the polarization of the radiation incident on them;

each device having an axis providing a greater speed of propagation of the radiation through the device, the devices being positioned such that said axes are arranged at differing predetermined angles with respect to the axis of the original incident radiation, the differing predetermined angles for said axes of the first and last of said devices including an incremental factor offset respectively in a positive and negative manner from said axis of original incident radiation; and means for selectively stressing all of the devices by the same amount to effect the rotation of the polarization of all of the wavelengths through said fixed angle.

2. Apparatus for concurrently effecting the selective polarization rotation through the same fixed angle of a plurality of linearly polarized wavelengths of light of a band provided by a source, comprising:

a plurality of electro-optic devices having substantially identical retardation and dispersion of birefringence and equivalent in number to the number of wavelengths of light arranged in cascade to receive the light and normally operative to pass the light without effect on the polarization of said light;

each device having an electro-optic axis providing a greater speed of propagation of the light through the device, the devices being arranged such that said axes are arranged at differing predetermined angles with respect to the axis of the original incident light, the differing predetermined angles for said axes of the first and last of said devices including an incremental factor offset respectively in a position and negative manner from said axis of original incident light; and means coupled to said devices for selectively activating all of the devices in the same manner to effect the rotation of the polarization of all of the wavelengths through said fixed angle.

3. The apparatus of claim 2, wherein the last named means comprises a variable source of potential, the potential activating said devices being substantially the half-wavelength voltage for said devices and for a wavelength substantially midway within said band, the band of said wavelengths being altered as said potential is varied.

4. The apparatus of claim 2, wherein the fixed angle is 90° and the plurality of wavelengths is an odd number, the devices being arranged such that said axis of the centrally located device is at an angle of 45° with respect to the axis of the original incident light, said axes of the first one-half of the remainder of such devices being arranged to provide angles with respect to the axis of the original incident light according to the progression:

$$\frac{45°}{2\,(\exp.)\frac{n+1}{2}}+\Delta;\quad 4\left[\frac{45°}{2\,(\exp.)\frac{n+1}{2}}\right];\quad 8\left[\frac{45°}{2\,(\exp.)\frac{n+1}{2}}\right]\cdots$$

and said axes of the second one-half of the remainder of such devices are arranged to provide angles with respect to the original incident light according to the progression:

$$90°-\frac{45°}{2\,(\exp.)\frac{n+1}{2}}-\Delta;\quad 4\left[90°-\frac{45°}{2\,(\exp.)\frac{n+1}{2}}\right];\quad 8\left[90°-\frac{45°}{2\,(\exp.)\frac{n+1}{2}}\right]\cdots$$

$n$ being the number of such devices and $\Delta$ said incremental factor.

5. The apparatus of claim 2, wherein the fixed angle is 90° and the plurality of wavelengths is an even number, the devices being arranged such that said axes of the first half of such devices have angles with respect to the axis of the original incident light according to the progression:

$$\frac{22.5°}{n-1}+\Delta;\quad 4\left(\frac{22.5°}{n-1}\right);\quad 8\left(\frac{22.5°}{n-1}\right)\cdots$$

and said axes of the second one-half of said devices have angles with respect to the axis of the original incident light according to the progression:

$$90°-\frac{22.5°}{n-1}-\Delta;\quad 4\left(90°-\frac{22.5°}{n-1}\right);$$
$$8\left(90°-\frac{22.5°}{n-1}\right)\cdots$$

$n$ being the number of such devices and $\Delta$ said incremental factor.

6. An achromatic light polarization rotator, comprising:
a source of linearly polarized light of a plurality of wavelengths for providing a light beam on a given axis;
a plurality of electro! electro-optic devices having substantially identical retardation and dispersion of birefringence and equivalent in number to the number of light wavelengths to be rotated arranged in cascade to receive the polarized light beam and normally passing the light without effect on the polarization of the light beam but effective to retard the polarization of said beam when activated;
each of said devices having a preferred axis providing a greater speed of propagation of the light beam through the device;
the axes of said devices being positioned such that they are at differing predetermined angles with respect to said given axis, so that retardation of the beam through a fixed angle occurs in response to the activation of said devices, said retardation being the cumulative retardation imparted by the individual devices on the light beam incident on it; and
means for selectively activating all of the devices in the same manner to effect the retardation and rotation of the polarization of all wavelengths through a fixed angle from said given axis.